United States Patent [19]

Takahashi

[11] Patent Number: 5,798,794
[45] Date of Patent: Aug. 25, 1998

[54] WAVELET TRANSFORM SUBBAND CODING WITH FREQUENCY-DEPENDENT QUANTIZATION STEP SIZE

[75] Inventor: Tsutomu Takahashi, Tsurugashima, Japan

[73] Assignee: Pioneer Electronic Corporation, Tokyo, Japan

[21] Appl. No.: 579,908

[22] Filed: Dec. 28, 1995

[30] Foreign Application Priority Data

Dec. 28, 1994 [JP] Japan ................................ 6-328709

[51] Int. Cl.$^6$ .................................................. H04N 7/30
[52] U.S. Cl. .................................... 348/398; 348/405
[58] Field of Search ............................ 348/398, 397, 348/403, 404, 405, 390, 384; 382/248, 251; H04N 7/133

[56] References Cited

U.S. PATENT DOCUMENTS

| | | | |
|---|---|---|---|
| 5,537,493 | 7/1996 | Wilkinson | 382/240 |
| 5,541,659 | 7/1996 | Kojima | 348/398 |
| 5,546,477 | 8/1996 | Knowles et al. | 382/242 |

FOREIGN PATENT DOCUMENTS

5-276499  10/1993  Japan .

Primary Examiner—Bryan S. Tung
Attorney, Agent, or Firm—Evenson, McKeown, Edwards & Lenahan PLLC

[57] ABSTRACT

A subband coding method for dividing a luminance signal or a color difference signal in a digital video signal into a plurality of frequency bands in vertical and horizontal directions in a spatial frequency region by executing two-dimensional multilayer wavelet transform on each processing unit (field) of the digital video signal, and of the divided frequency bands of a luminance or color difference signal, an LH band consisting of high frequency components in the vertical direction and low frequency components in the horizontal direction in the layer consisting of the highest frequency bands, an HL band consisting of low frequency components in the vertical direction and high frequency components in the horizontal direction, an HH band consisting of high frequency components in the horizontal and vertical directions having quantization step size (Q_STEP_SIZE) set in a relationship of Q_STEP_SIZE(LH)<Q_STEP_SIZE(HL)<Q_STEP_SIZE(HH) for the luminance signal and in relationship of Q_STEP_SIZE(HL)<Q_STEP_SIZE(LH)<Q_STEP_SIZE(HH) for the color difference signal.

2 Claims, 11 Drawing Sheets

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

FIG.14

WAVELET TRANSFORM SUBBAND CODING WITH FREQUENCY-DEPENDENT QUANTIZATION STEP SIZE

BACKGROUND OF THE INVENTION

1. Field of the Invention

The present invention relates to an image data compressing technique, and, more particularly, to a subband coding method.

2. Description of the Related Art

In image data compressing techniques such as MPEG, an image is divided into blocks each of which is subjected to orthogonal transform like DCT (Discrete Cosine Transform) to concentrate the power of the image to specific frequency components and is then quantized and coded, thus accomplishing image data compression. Since this image data compressing technique involves the blocking of an image, it is likely to suffer the deterioration of the quality of an image such as blocking effects which make the boundary between adjoining blocks in a restored image discontinuous.

Recently, a subband coding method using wavelet transform as a solution to this shortcoming has been considered. This method divides a video signal into a plurality of frequency component signals based on filtering, not block transform, for the concentration of the power of the signal to specific frequency components, thereby acquire a plurality of subband signals, and then quantizes and encodes the subband signals to accomplish image data compression. An image data compressing apparatus which employs such subband coding is disclosed in, for example, Japanese Unexamined Patent Publication No. 5-276499. The frequency regions of the individual frequency component signals obtained by dividing a video signal are called "subbands".

However, since it is not known that how much weight should be put to which subband in order to obtain images with high compression efficiency and less quality deterioration, a restored image often suffers quality deterioration such as unclearness over the entire image, flickering and disturbed lines (contour lines).

SUMMARY OF THE INVENTION

Accordingly, it is an objective of the present invention to provide a subband coding method with wavelet transform capable of compressing a video signal with a high compression efficiency and with less quality deterioration of a restored image.

According to one aspect of this invention, there is provided a subband coding method for dividing a digital video signal with an interlaced structure into a plurality of frequency bands in vertical and horizontal directions in a spatial frequency region by executing two-dimensional multilayer wavelet transform on each processing unit (field) of the digital video signal, and quantizing the frequency bands, an LH band consisting of high frequency components in the vertical direction and low frequency components in the horizontal direction in the layer consisting of the highest frequency bands, an HL band consisting of low frequency components in the vertical direction and high frequency components in the horizontal direction, an HH band consisting of high frequency components in the horizontal and vertical directions having the quantization step size (Q_STEP_SIZE) set in a relationship of Q_STEP_SIZE(LH)<Q_STEP_SIZE(HL)<Q_STEP_SIZE(HH) for the luminance signal.

According to another aspect of this invention, there is provided a subband coding method for dividing a digital video signal with an interlaced structure into a plurality of frequency bands in vertical and horizontal directions in a spatial frequency region by executing two-dimensional multilayer wavelet transform on each processing unit (field) of the digital video signal, and quantizing the frequency bands, an LH band consisting of high frequency components in the vertical direction and low frequency components in the horizontal direction in the layer consisting of the highest frequency bands, an HL band consisting of low frequency components in the vertical direction and high frequency components in the horizontal direction, an HH band consisting of high frequency components in the horizontal and vertical directions, having the quantization step size (Q_STEP_SIZE) set in a relationship of Q_STEP_SIZE(HL)<Q_STEP_SIZE(LH)<Q_STEP_SIZE(HH) for the color difference signal.

DETAILED DESCRIPTION OF THE PREFERRED EMBODIMENT

An embodiment of the present invention will now be described with reference to the accompanying drawings.

Figure 1:
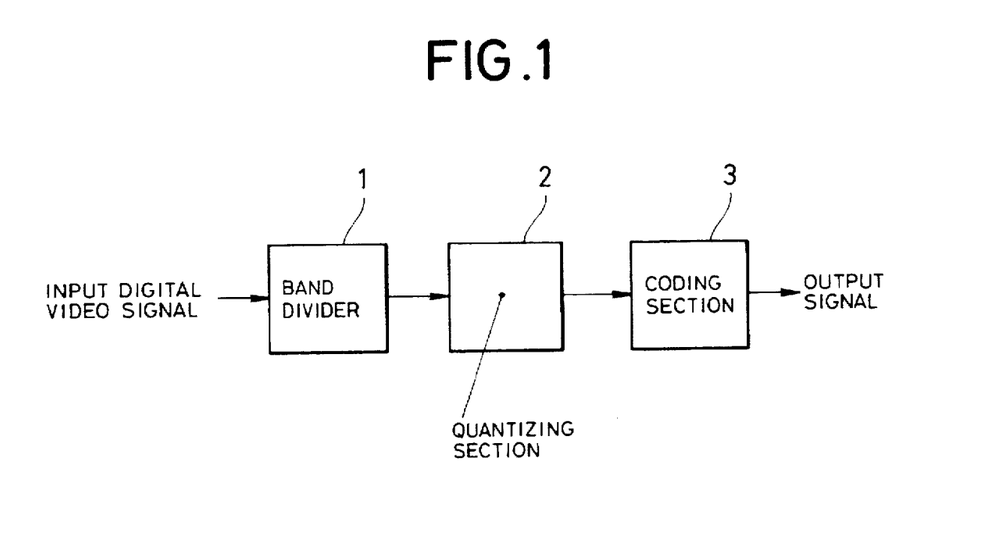
FIG. 1 is a block diagram showing an image data compressing apparatus using wavelet transform to which the present invention is adapted.

FIG. 1 shows an image data compressing apparatus embodying this invention. In this image data compressing apparatus, an input digital video signal is supplied to a band divider 1. The band divider 1, which will be discussed in detail later, performs 3-layer two-dimensional wavelet transform on the digital video signal in the spatial domain to divide the digital video signal into ten subbands.

The video signals in the ten subbands are supplied to a quantizing section 2. The quantizing section 2 performs linear quantization to further reduce the transmission rate of the signal whose redundancy has been eliminated. In high-efficiency coding, quality of a compressed image is mostly determined by the quantization. The quantized signals are supplied to a coding section 3 which in turn encodes each block of signals (which will be discussed later) to further reduce the transmission rate. Since run-length coding is used in this coding process, the consecutiveness of 0's determines the coding gain.

Figure 2:
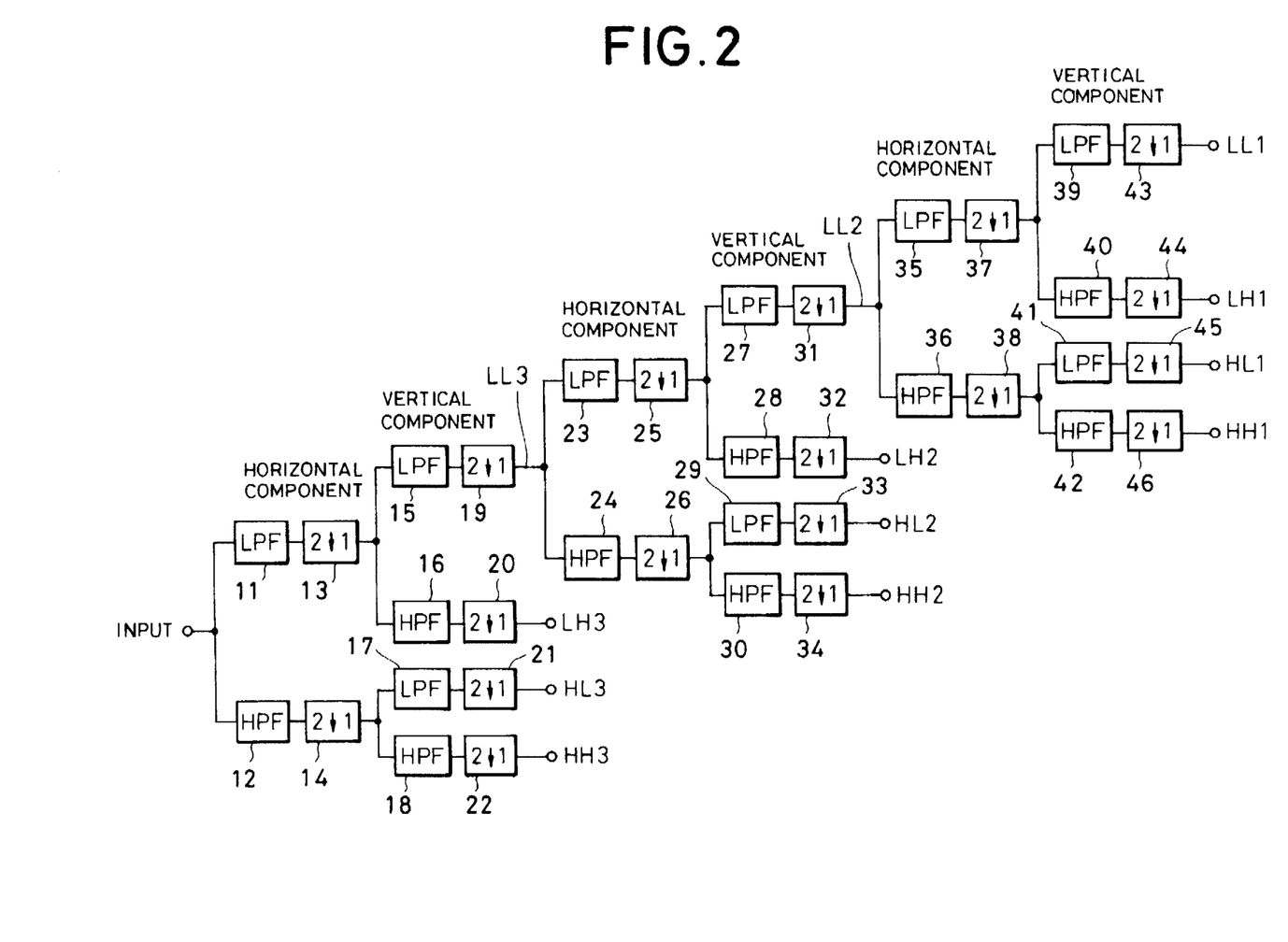
FIG. 2 is a block diagram showing the structure of a band divider in the apparatus in FIG. 1.

FIG. 2 specifically shows the structure of the band divider 1. An input digital video signal is a component digital signal having a 4:2:2 structure in a so-called D-1 format defined in the CCIR Rec.601. More specifically, this is the image data format in which luminance signal data Y has a sampling frequency of 13.5 MHz, and two color difference signal data Cr and Cb have sampling frequencies of 6.75 MHz. The input digital video signal is supplied to an LPF (Low-Pass Filter) 11 and HPF (High-Pass Filter) 12 for horizontal frequency division. Connected to the LPF 11 is a subsampler (2↓1) 13 which thins a low-band signal by the ratio of 2:1. Likewise, a subsampler 14 which thins a high-band signal by the ratio of 2:1 is connected to the HPF 12. The low-band signal output from the subsampler 13 is supplied to an LPF 15 and HPF 16 for vertical frequency division. The high-band signal output from the subsampler 14 is supplied to an LPF 17 and HPF 18 for vertical frequency division. Subsamplers 19 to 22 are respectively connected to the LPF 15, HPF 16, LPF 17 and HPF 18. The output signal of the subsampler 20 is a subband signal LH3 as one of ten divided signals, the output signal of the subsampler 21 is a subband signal HL3 and the output signal of the subsampler 22 is a subband signal HH3.

The portion indicated by those numerals "11" to "22" forms the first layer. Connected to the output of the subsampler 19 that generates the signal LL3 of the lowest frequency component in the first layer is the second layer, which comprises LPFs 23, 27 and 29, HPFs 24, 28 and 30 and subsamplers 25, 26 and 31 to 34 in the same manner as the first layer. The output signal of the subsampler 32 is a subband signal LH2, the output signal of the subsampler 33 is a subband signal HL2 and the output signal of the subsampler 34 is a subband signal HH2. Further, the third layer, which comprises LPFs 35, 39 and 41, HPFs 36, 40 and 42 and subsamplers 37, 38 and 43 to 46 in the same manner as the first layer or the second layer, is connected to the output of the subsampler 31 that generates the signal LL2 of the lowest frequency component in the second layer. The output signal of the subsampler 43 is a subband signal LL1, the output signal of the subsampler 44 is a subband LH1, the output signal of the subsampler 45 is a subband signal HL1 and the output signal of the subsampler 46 is a subband signal HH1.

Figure 3:
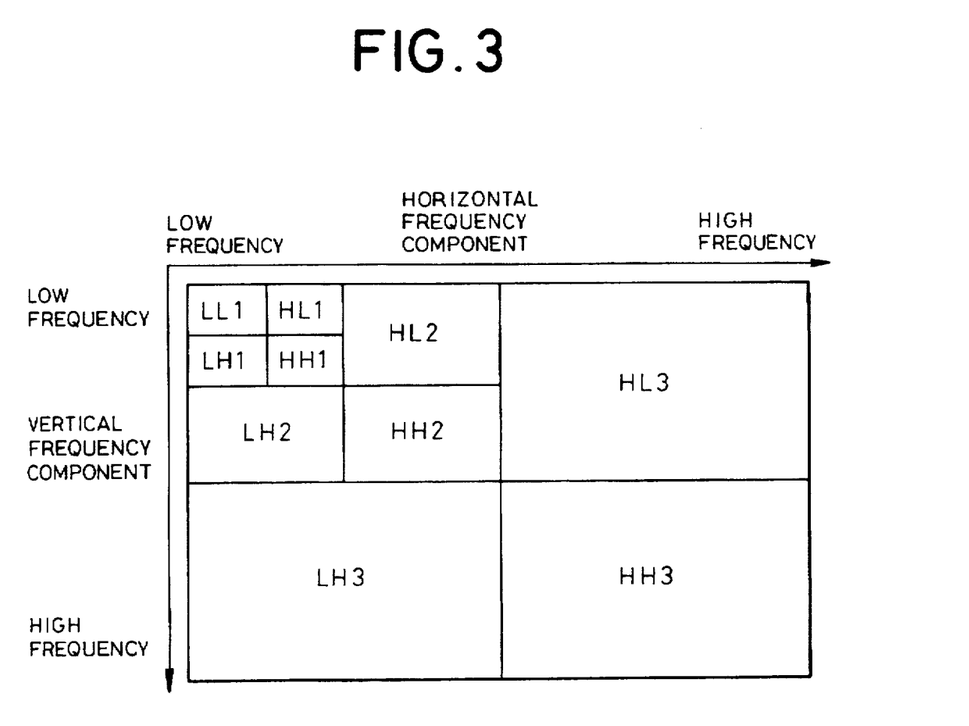
FIG. 3 is a diagram showing divided subbands in a spatial frequency region.

FIG. 3 shows the bands of the signals LL1 to HH3 obtained by dividing the input into ten subbands, in a two-dimensional frequency region. In FIG. 3, the vertical scale represents the frequency in the vertical direction, and the horizontal scale represents the frequency in the horizontal direction. The ratio of the areas of the individual regions in FIG. 3 matches with the ratio of the number of pieces of data in the individual subband signals.

Figure 4:
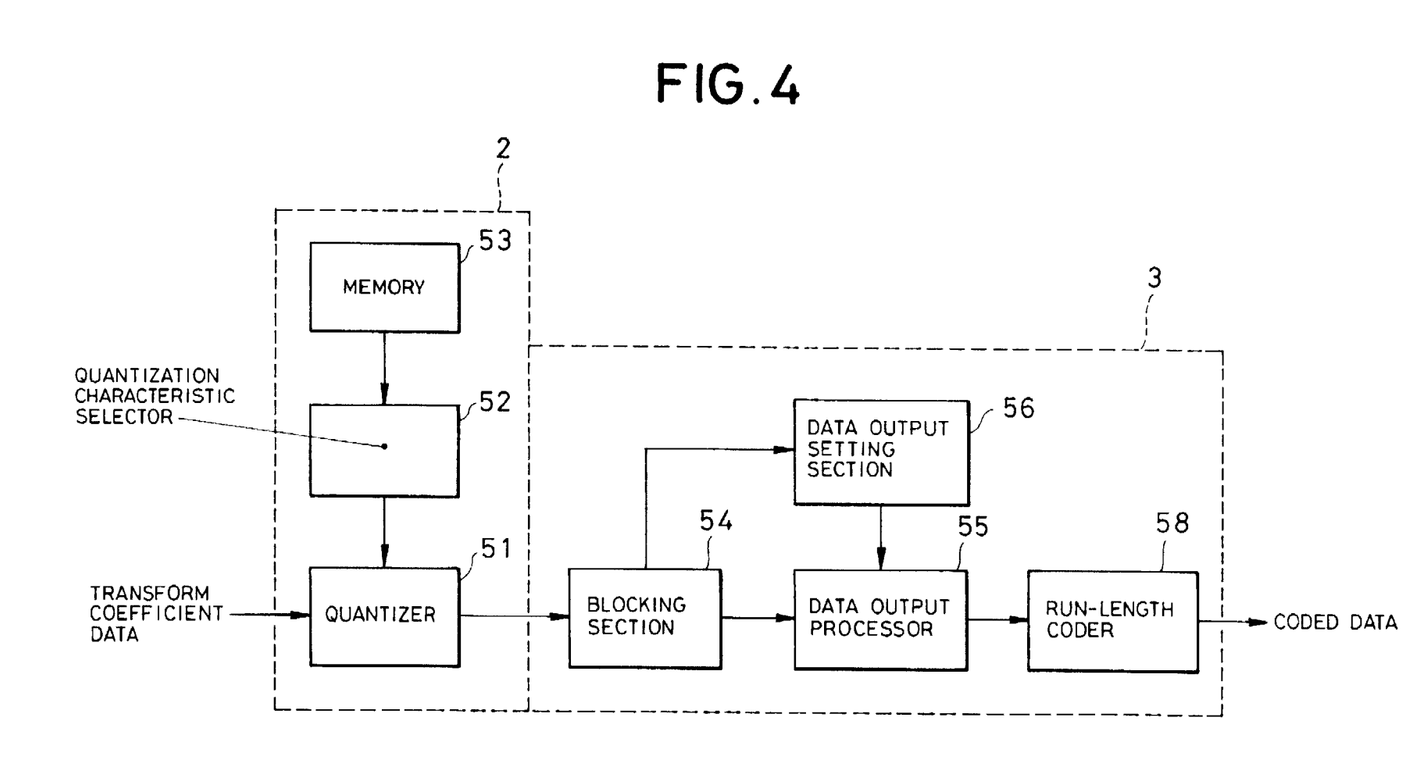
FIG. 4 is a block diagram showing the structures of a quantizing section and a coding section in the apparatus in FIG. 1.

FIG. 4 specifically shows the structures of the quantizing section 2 and the coding section 3. The ten subband signals, or two-dimensional wavelet transform coefficient data output from the band divider 1 are supplied to a quantizer 51 in the quantizing section 2. The quantizer 51 linearly quantizes the transform coefficient data in accordance with a quantization step size output from a quantization characteristic selector 52, and sends the quantized data to the aforementioned coding section 3. Since a memory 53 having previously stored the ratio of the quantization step sizes for each subband is connected to the selector 52, the selector 52 selects a ratio of the quantization step size from the memory 53 in accordance with the frequency band of the supplied transform coefficient data to set the quantization step size.

In the coding section 3, the quantized wavelet transform coefficient data from the quantizer 51 is supplied to a blocking section 54. The blocking section 54 rearranges the quantized wavelet transform coefficient data into blocks. Each block contains 64 wavelet transform coefficient data picked up from ten subbands. The method of rearrange will be discussed later. Connected to the blocking section 54 is a data output processor 55 which outputs the data in a block in a predetermined order block by block. The output order for the 64 transform coefficient data is set by a data output setting section 56. The setting section 56 includes, for example, a memory which stores a predetermined data output order.

A run-length coder 58 is connected to the output of the data output processor 55. The run-length coder 58 performs run-length coding on a data train output from the data output processor 55. The run-length coded data train is compressed video signal data.

Figure 5:
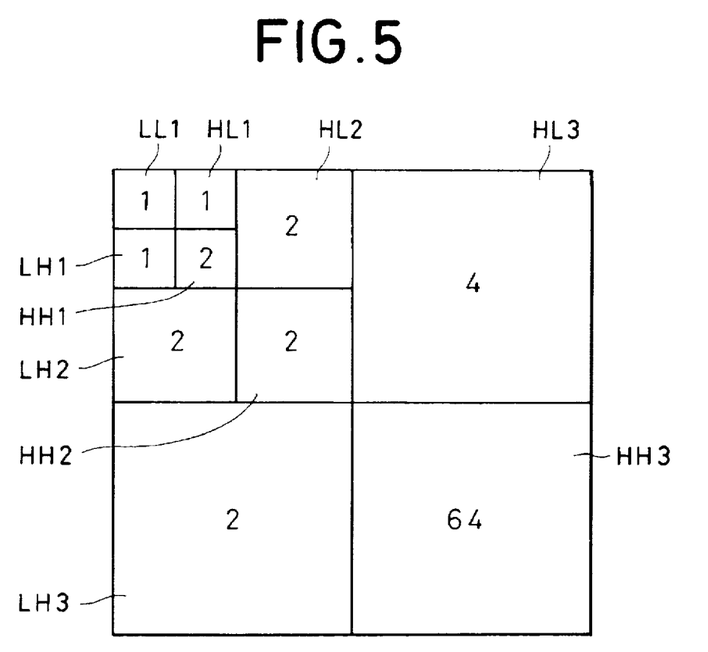
FIG. 5 is a diagram showing the ratio of quantization step size for a luminance signal.
Figure 6:
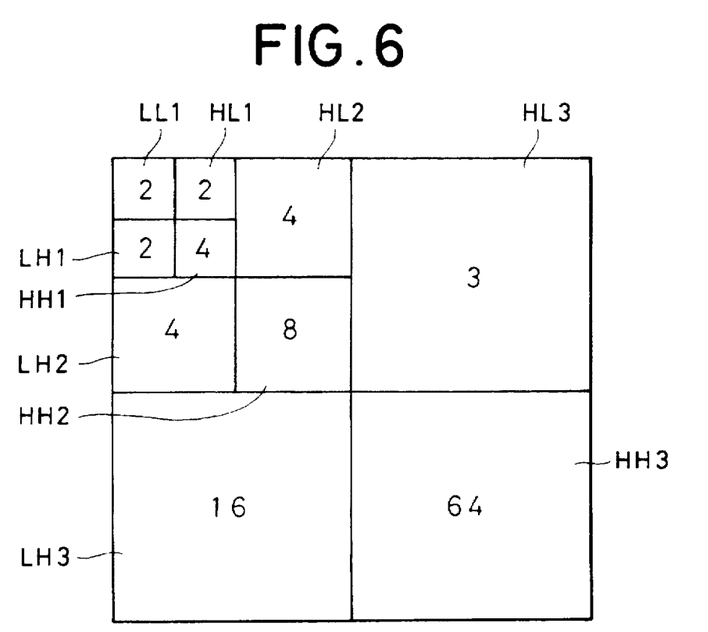
FIG. 6 is a diagram showing the ratio of quantization step size for a color difference signal.

In the thus constituted quantizing section 2 and coding section 3, the transform coefficient data output from the band divider 1 is linearly quantized by the quantizer 51 in accordance with the quantization step size output from the quantization characteristic selector 52. An example of the quantization step size ratios of the individual subbands to the subband LL1 of luminance signal is shown in FIGS. 5 and 6. FIG. 5 shows the ratios of quantization step sizes for a luminance signal, and FIG. 6 shows the ratios of quantization step sizes for a color difference signal. When the transform coefficient data is luminance signal data, the quantization characteristic selector 52 sets the quantization step sizes of subbands according to the ratios shown in FIG. 5 and outputs them to the quantizer 51. When the transform coefficient data is color difference signal data, the quantization characteristic selector 52 sets the quantization step sizes of subbands according to the ratios shown in FIG. 6 and outputs them to the quantizer 51. The quantization is carried out by, for example, dividing the transform coefficient data by the set quantization step size.

Figure 7:
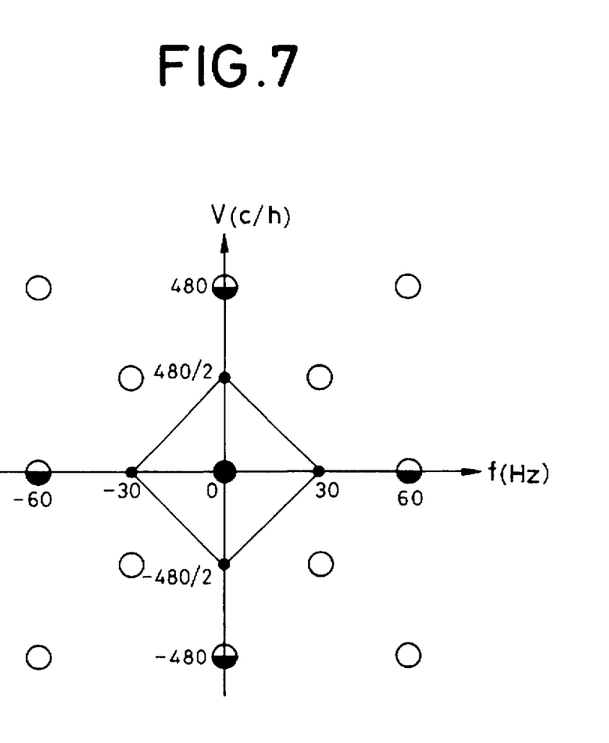
FIG. 7 is a diagram showing the spectrum of the vertical frequency and time domain of a luminance signal.

When one frame of a luminance signal in an interlaced image has a size of 704 pixels by 480 lines as defined in the CCIR Rec.601, the spectrum of the vertical and time domain in the three-dimensional spectrum of the luminance signal become as shown in FIG. 7. The vertical sampling frequency is 480 c/h with respect to one screen height, and the temporal sampling frequency along the time is 60 Hz. In interlace scanning, sampling points of the first field and second field have offset. Therefore, one of carriers (see circles in FIG. 7) occurs at the vertical spatial frequency v=240 c/h and the temporal frequency f=30 Hz. These carriers arise from an interlaced structure. A frequency range of the interlaced image is restricted to the region bounded by a lozenge in FIG. 7.

When the luminance signal is separately coded for first and second fields, each field has a size of 704 pixels by 240 lines. The intra-field coding can accomplish high-efficiency coding without interfering with image movement. Since the vertical frequency component is folded in this case, the distribution of the vertical spectrum of each field greatly differs from the distribution of the vertical spectrum of a frame. The highest frequency component and intermediate frequency components in a frame in the vertical direction are respectively aliased into DC component and vertical high frequency components in the field processing. As a result of aliasing, the intra-field coded signal has a large amount of high vertical frequency components. Taking this fact into consideration, the quantization step sizes of subbands in vertical direction are set finer than those in horizontal direction.

In order to estimate relative importance of each subband, quality and signal-to-noise ratio (SNR) of restored image, in which all transform coefficients in a specific subband were eliminated and coefficients in the other subbands were not quantized, were evaluated. The original image used in the experiment is the "mobile & calendar" which is a standard MPEG image.

The followings are the experimental results for luminance signal. The numerals in parentheses indicate the average SNR.
(1) The transform coefficients in HH3 are eliminated. (31.4 dB)
  Quality: Slight disturbance on oblique lines which is hardly significant.
(2) The transform coefficients in LH3 are eliminated. (22.1 dB)
  Quality: Shadowy over the entire image.
(3) The transform coefficients in HL3 are eliminated. (28.2 dB)
  Quality: Disturbance on vertical lines.
(4) The transform coefficients in HH2 are eliminated. (30.0 dB)
  Quality: Oblique deterioration occurred.
(5) The transform coefficients in LH2 are eliminated. (22.8 dB)
  Quality: All edge portions blurred.
(6) The transform coefficients in HL2 are eliminated. (27.4 dB)
  Quality: Disturbance on the vertical edge portions.
(7) The transform coefficients in HH1 are eliminated. (31.2 dB)
  Quality: Oblique waves occurred on the entire image.
(8) The transform coefficients in LH1 are eliminated. (23.8 dB)
  Quality: Blurring over the entire image.
(9) The transform coefficients in HL1 are eliminated. (29.3 dB)
  Quality: Vertical waves occurred on the entire image.

Figure 8:
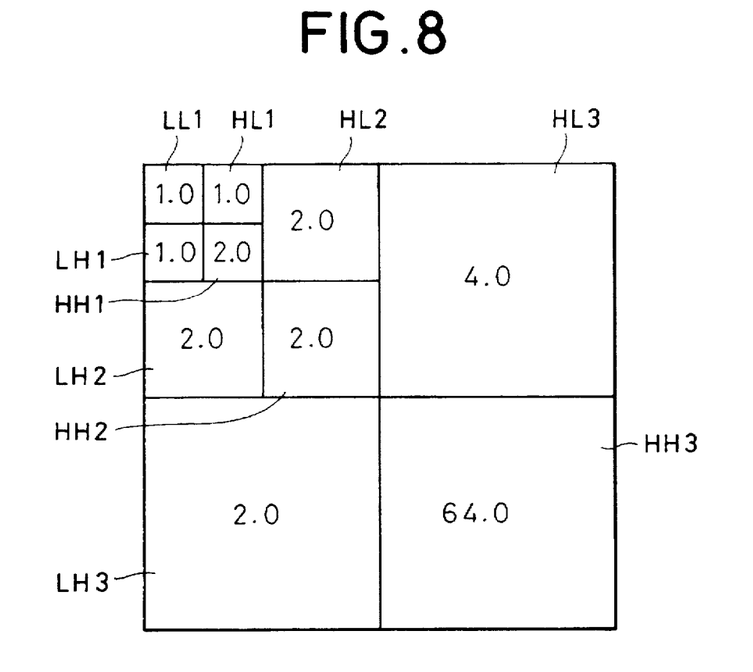
FIG. 8 is a diagram exemplifying how the quantization step sizes of the individual subbands of a luminance signal are set.
Figure 9:
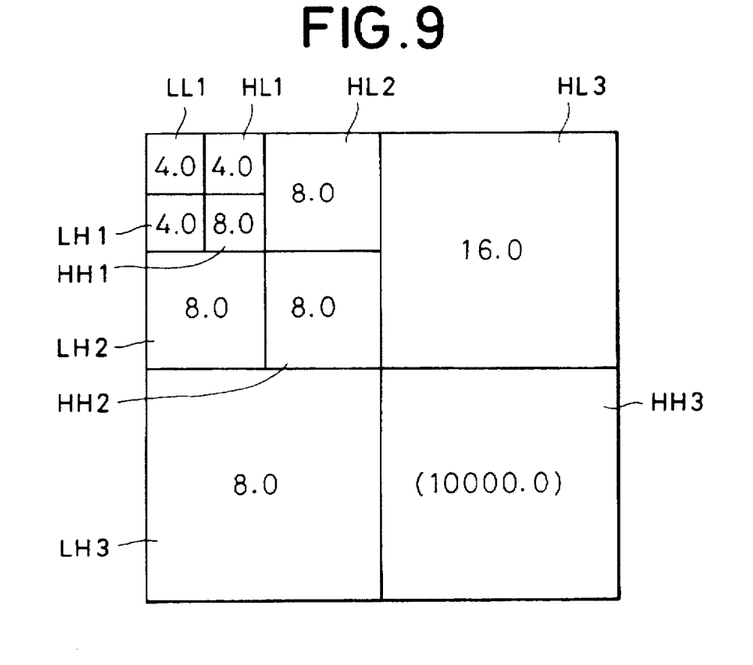
FIG. 9 is a diagram of another example showing how the quantization step sizes of the individual subbands of a luminance signal are set.

It is apparent from the results of the experiment on the luminance signal that the overall image becomes unclear and the SNR becomes significantly poor for the images obtained by restoring compressed image signals from which the vertical frequency components, such as subband signal LH1, LH2 or LH3, have been completely removed. Therefore, the quantization step size of LH3 should be set smaller than that of HL3 and the quantization step size of HH3 can be set large. In the experiment, the restored image had a good quality with less deterioration when the quantization step size for each subband of the luminance signal was set to the level shown in FIG. 8 or FIG. 9. The quantization step size of HH3 in FIG. 9 is 10000.0 which indicates that data has been eliminated completely.

The following are the results of quality assessment on restored image in which all transform coefficients of color difference signals in a specific subband were eliminated and coefficients in the other subbands were not quantized.
(1) The transform coefficients in HH3 are eliminated.
  Quality: Slight disturbance in the oblique direction.
(2) The transform coefficients in LH3 are eliminated.
  Quality: Color changed and blurred at the edge portions.
(3) The transform coefficients in HL3 are eliminated.
  Quality: Vertical deterioration occurred.
(4) The transform coefficients in HH2 are eliminated.
  Quality: Oblique deterioration occurred.
(5) The transform coefficients in LH2 are eliminated.
  Quality: Disturbance occurred at the edge portions.
(6) The transform coefficients in HL2 are eliminated.
  Quality: Disturbance occurred on the vertical edge portions.
(7) The transform coefficients in HH1 are eliminated.
  Quality: Oblique waves occurred on the entire image.
(8) The transform coefficients in LH1 are eliminated.
  Quality: Blurring occurred over the entire image.
(9) The transform coefficients in HL1 are eliminated.
  Quality: Vertical waves occurred on the entire image.

Figure 10:
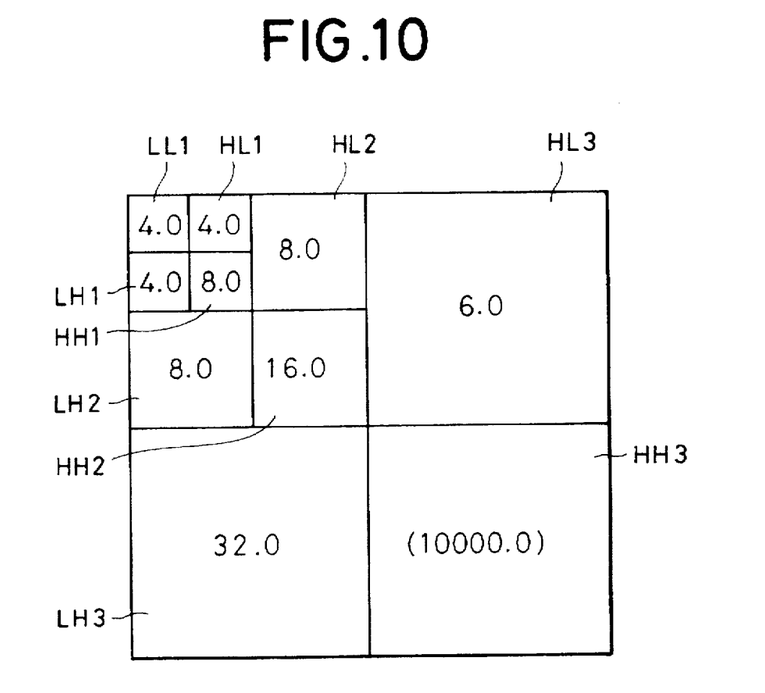
FIG. 10 is a diagram exemplifying how the quantization step sizes of the individual subbands of a color difference signal are set.

It is apparent from the results of the experiment on the color difference signals that the quantization step size of LH3 can be set greater than that of the signal HL3. In the experiment, the restored images had an excellent quality when the quantization step size of the color difference signal for each subband was set to the level in FIG. 10. The quantization step size of HH3 in FIG. 10, like that in FIG. 9, is set to 10000.0 which likewise indicates the complete elimination of data.

The blocking section 54 operates as follows: One piece of data in each of LL1, LH1, HL1 and HH1 which have the same size in spatial frequency regions is assigned to one block. With regard to each of LH2, HL2 and HH2, four pieces of data are assigned to one block. With regard to each of LH3, HL3 and HH3, sixteen pieces of data are assigned to one block. The single block contains 64 pieces of data. When those 64 pieces of data are extracted from the output signal of the quantizer 51, a single blocking process has been completed.

Figure 11A:
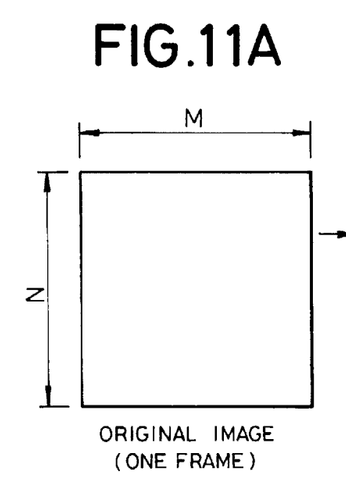
FIGS. 11A through 11E are diagrams for explaining wavelet transform for one frame.
Figure 11B:
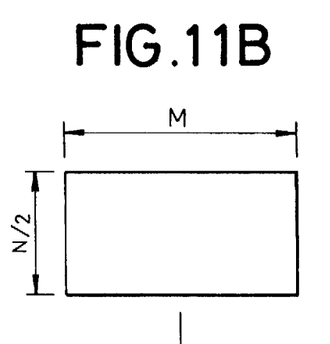
Figure 11C:
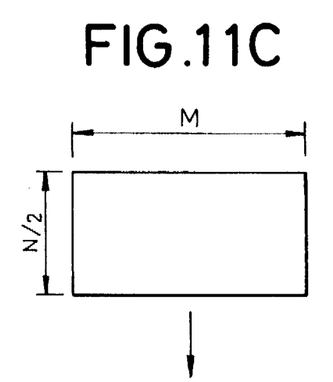
Figure 11D:
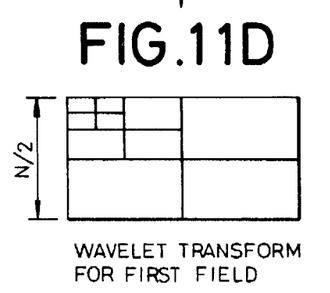
Figure 11E:
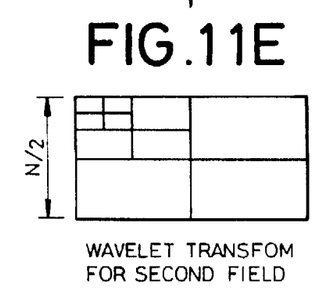

This operation will be described more specifically. Suppose that one frame of input digital video signals has an interlaced structure of M pixels by N lines as shown in FIG. 11A. Then, wavelet transform is performed separately for the first and second fields having M pixels by N/2 lines, respectively as shown in FIGS. 11B and 11C. When 3-layer wavelet transform is performed on one field of an image, ten subbands are produced as mentioned earlier, and the sum of the numbers of data points of the ten subbands is equal to $M \times N/2$ which is the number of data points for one field as shown in FIGS. 11D and 11E. Since the two-dimensional frequency region is divided into the ten subbands in an octave scale by wavelet transform, not all the numbers of data points of ten subbands are the same. As the sampling interval of data is inversely proportional to the band width of the subband, the numbers of data points in the subbands form a quad tree structure from the low frequency to the high frequency. That is, the number of pieces of data is $(M/8) \times (N/2/8)$ in LL1, HL1, LH1 and HH1, the number of pieces of data is $(M/4) \times (N/2/4)$ in HL2, LH2 and HH2, and the number of pieces of data is $(M/2) \times (N/2/2)$ in HL3, LH3 and HH3.

Figure 12A:
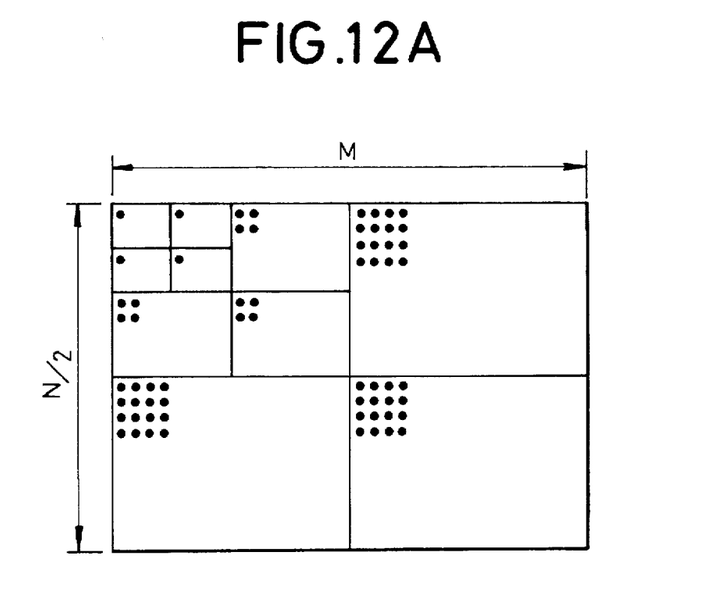
FIGS. 12A and 12B are diagrams for explaining blocking.
Figure 12B:
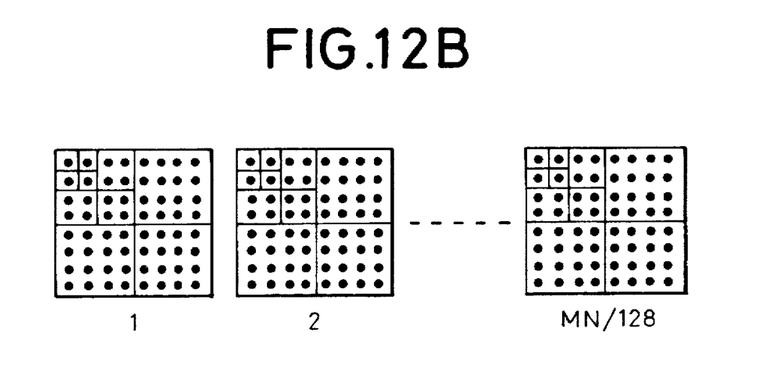

Assuming that a block consists of 8×8 pieces of data, and data picked up from ten subbands are rearranged in the block. This block is called "overlap macroblock". FIGS. 12A and 12B show a process of construction of overlap macroblocks from ten subbands in a field. In proportion to the number of pieces of data of each subbands, one piece of data is extracted from each of LL1, HL1, LH1 and HH1, four pieces of data are extracted from each of HL2, LH2 and HH2, and sixteen pieces of data are extracted from each of HL3, LH3 and HH3, as shown in FIG. 12A. Those pieces of data are allocated at the associated positions as shown in FIG. 12B, thus forming an overlap macroblock. As a result, (M/8)×(N/16) data blocks are produced per field. This process is simple data rearrangement, and quantization is executed subband by subband and does not thus cause any blocking effects.

Figure 13:
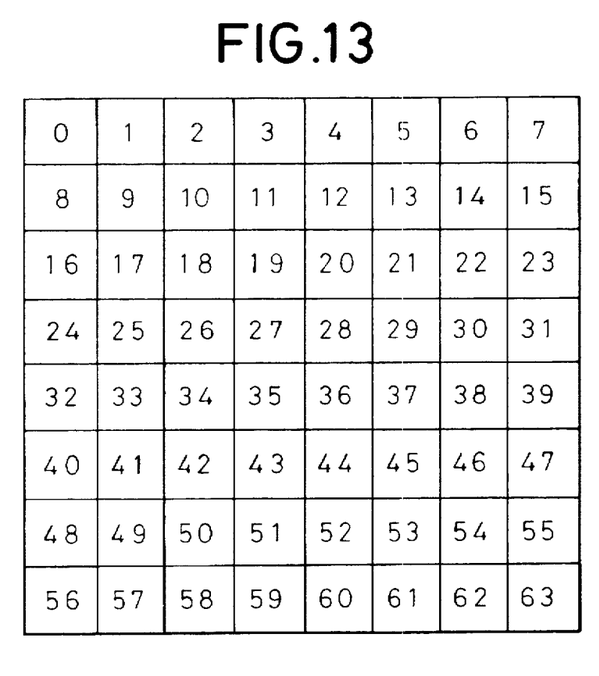
FIG. 13 is a diagram showing 64 pieces of data in a block.

Each overlap macroblock contains 64 pieces of data numbered from 0 to 63 as shown in FIG. 13. That is, the data 0 is the data picked up from LL1, the data 1 is the data picked up from HL1, the data 8 is the data picked up from LH1, the data 9 is the data picked up from HH1, the data 2, 3, 10 and 11 are the data picked up from HL2, the data 16, 17, 24 and 25 are the data picked up from LH2, the data 18, 19, 26 and 27 are the data picked up from HH2, the data 4 to 7, 12 to 15, 20 to 23 and 28 to 31 are the data picked up from HL3, the data 32 to 35, 40 to 43, 48 to 51 and 56 to 59 are the data picked up from LH3, and the data 36 to 39, 44 to 47, 52 to 65 and 60 to 63 are the data picked up from HH3.

The upper left of the thus obtained overlap macroblock indicates the lowest frequency component in both the vertical and horizontal directions and the lower right indicates the highest frequency component in the oblique direction. The overlap macroblock, like the block obtained by DCT, represents the power distribution of the frequency components from the low frequency to the high frequency in the direction from the upper left to the lower right. There are ten types of transform coefficients in this case whereas there are 64 types for the DCT. In other words, an overlap macroblock contains a plurality of transform coefficients belonging to the same types except for the coefficients picked up from LL1, HL1, LH1 and HH1.

Sixty-four pieces of data are output from the data output processor 55 in a one-dimensional order determined by the data output setting section 56. The setting section 56 stores the data order to scan and output data in the following order. The numerals below are associated with the data numbers shown in FIG. 13.

0→8→1→9→16→17→24→25→2→10→3→11→26→18→27→
19→32→33→34→35→40→41→42→43→48→49→50→51→
56→57→58→59→4→12→20→28→5→13→21→29→6→
14→22→30→7→15→23→31→60→52→61→44→53→62→
36→45→54→63→37→46→45→38→47→39

Figure 14:
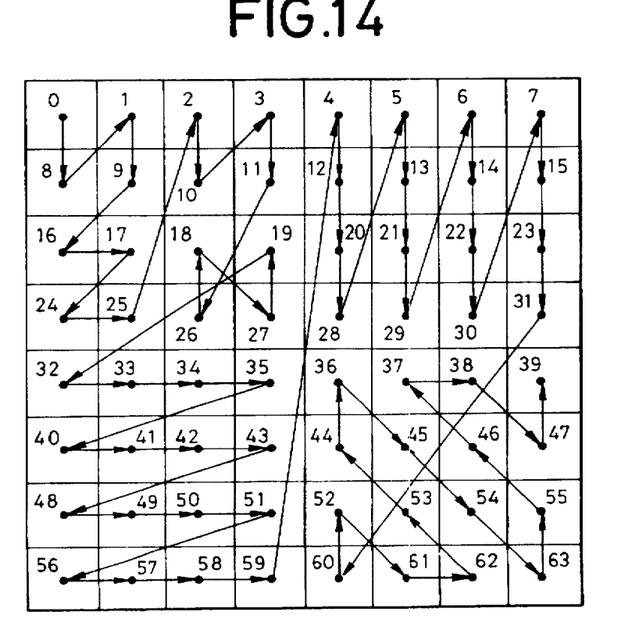
FIG. 14 is a diagram showing the scanning and output order in a block.

The scanning and outputting order in a block becomes as indicated by the arrows in FIG. 14. When one image (one field) consists of MN/128 data blocks from the first block to the (MN/128)-th block as in the above case, MN/128blocks are output.

This data scanning order is determined by taking the following three points in consideration.

(1) The scanning and outputting direction in a block is changed in accordance with the subbands.

(2) For subbands belonging to the same layer, the data are scanned and output in the order of LH→HL→HH.

(3) The scanning and outputting are performed toward higher layers from a lower layer.

With regard to the point (1), the data are scanned and output in the vertical direction for the subbands, such as LH2 and LH3, which have a low frequency in the horizontal direction and a high frequency in the vertical direction. Consequently, zero-runs (consecutive 0's) are likely to occur. With regard to the point (2), in the same layer, since LH contains aliased components by interlace, zero-runs are most unlikely to occur, while HH contains an oblique frequency components, they are coarsely quantized so that zero-runs are likely to occur. In this respect, if the data are scanned and output in the order of LH→HL→ HH and an EOB (End Of Block) code, which indicates that there are no non-zero data after that, is affixed in the run-length coding, data following that code can be cut off. With regard to the point (3), power of a higher layer is lower than that of a lower layer and there are more 0's for the higher layer, so that data following the EOB code can be cut off in the run-length coding.

When a one-dimensional sequence of 64 pieces of data is obtained for each overlap macroblock consisting of 8×8 (=64) pieces of transform coefficient data as explained above, the coding section 3 performs variable length coding on the zero-runs and levels of the one-dimensional sequence of 64 pieces of data by the run-length coder 58. The run-length coder codes combination of zero-run and level of data, which terminates the zero-run, with Haffman code. If there are no non-zero data after the last non-zero data in a block, an EOB (End Of Block) code is added and the coding on the block is terminated.

If transform coefficient data of the subband HH3 are cut off by the quantization in the quantizing section 2, a one-dimensional sequence of 48 pieces of data is obtained from a single overlap macroblock consisting of 8×8=64 . pieces of transform coefficient data. In this case, the coding section 3 performs variable length coding on the zero-runs and levels of the one-dimensional sequence of 48 pieces of data.

Although a component digital signal having a 4:2:2 structure is used as an input digital video signal in the above-described embodiment, a component digital signal having a 4:1:1 structure as defined in the CCIR Rec.601 may also be used.

Although 3-layer wavelet transform is executed in this embodiment, this invention is not limited to this particular type and other types of multilayer wavelet transform such as 2-layer wavelet transform and 4-layer wavelet transform may also be performed.

According to the subband coding method of the present invention, the frequency bands obtained by dividing the luminance signal, an LH band consisting of high frequency components in the vertical direction and low frequency components in the horizontal direction in the layer consisting of the highest frequency bands, an HL band consisting of low frequency components in the vertical direction and high frequency components in the horizontal direction, an HH band consisting of high frequency components in the horizontal and vertical directions have quantization step size (Q_STEP_SIZE) set in a relationship of

Q_STEP_SIZE(LH)<Q_STEP_SIZE(HL)<Q_STEP_SIZE(HH)

in consideration of the interlaced structure of the luminance signal. It is therefore possible to quantize the luminance signal with the adequate quantization step size.

Further, according to the subband coding method of the present invention, the frequency bands obtained by dividing the color difference signal, an LH band consisting of high frequency components in the vertical direction and low frequency components in the horizontal direction in the layer consisting of the highest frequency bands, an HL band consisting of low frequency components in the vertical direction and high frequency components in the horizontal direction, an HH band consisting of high frequency components in the horizontal and vertical directions have quantization step size (Q_STEP_SIZE) set in a relationship of $$Q\_STEP\_SIZE(HL) < Q\_STEP\_SIZE(LH) < Q\_STEP\_SIZE(HH).$$

It is therefore unnecessary, unlike in the case of luminance signal, to consider the interlaced structure and the data of the color difference signal containing fewer than the data of the luminance signal, can be quantized with the adequate quantization step size.

It is apparent from the above that the present invention can compress a video signal with a high compression efficiency and with less quality deterioration of a restored image.

What is claimed is:

1. A subband coding method for dividing a luminance signal in a digital video signal having an interlaced structure into a plurality of frequency bands in vertical and horizontal directions in a spatial frequency region by executing two-dimensional multilayer wavelet transform on each processing unit (field) of said digital video signal, and quantizing said frequency bands, wherein an LH band consisting of high frequency components in the vertical direction and low frequency components in the horizontal direction in the layer consisting of the highest frequency bands, an HL band consisting of low frequency components in the vertical direction and high frequency components in the horizontal direction, an HH band consisting of high frequency components in the horizontal and vertical directions, of the divided frequency bands of said luminance signal, have quantization step size (Q_STEP_SIZE) set in a relationship of $$Q\_STEP\_SIZE(LH) < Q\_STEP\_SIZE(HL) < Q\_STEP\_SIZE(HH).$$

2. A subband coding method according to claim 1, further dividing a color difference signal in said digital video signal into said frequency bands, and quantizing said frequency bands, wherein an LH band consisting of high frequency components in the vertical direction and low frequency components in the horizontal direction in the layer consisting of the highest frequency bands, an HL band consisting of low frequency components in the vertical direction and high frequency components in the horizontal direction, an HH band consisting of high frequency components in the horizontal and vertical directions, of the divided frequency bands of said color difference signal, have quantization step size (Q_STEP_SIZE) set in a relationship of $$Q\_STEP\_SIZE(HL) < Q\_STEP\_SIZE(LH) < Q\_STEP\_SIZE(HH).$$

* * * * *